United States Patent
Kurata

(10) Patent No.: US 6,883,962 B2
(45) Date of Patent: Apr. 26, 2005

(54) TIRE WEAR FORECASTING METHOD AND APPARATUS

(75) Inventor: Takayuki Kurata, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 213 days.

(21) Appl. No.: 09/810,603

(22) Filed: Mar. 19, 2001

(65) Prior Publication Data

US 2001/0022802 A1 Sep. 20, 2001

(30) Foreign Application Priority Data

Mar. 17, 2000 (JP) .................................. P2000-077008

(51) Int. Cl.$^7$ .......................... G01N 3/60; G01N 25/00; G01J 5/00
(52) U.S. Cl. ................. 374/57; 374/5; 374/7; 374/45; 374/121; 374/153
(58) Field of Search .............................. 374/4, 5, 6, 7, 374/45, 121, 57, 141, 153; 73/146; 152/154.2; 116/208

(56) References Cited

U.S. PATENT DOCUMENTS

| | | | | |
|---|---|---|---|---|
| 3,535,536 A | * | 10/1970 | Pernau ................... | 250/559.44 |
| 3,549,986 A | * | 12/1970 | Prine ........................... | 324/629 |
| 3,807,226 A | * | 4/1974 | Williams ................... | 250/338.1 |
| 3,854,336 A | * | 12/1974 | Bibby ......................... | 374/124 |
| 4,673,298 A | * | 6/1987 | Hunter et al. ............... | 374/122 |
| 4,995,197 A | * | 2/1991 | Shieh et al. .................... | 451/1 |
| 5,088,321 A | * | 2/1992 | Kajikawa et al. ............. | 356/71 |
| 5,216,372 A | * | 6/1993 | Zoughi et al. ............... | 324/638 |
| 5,245,867 A | * | 9/1993 | Sube et al. .................... | 73/146 |
| 5,483,827 A | * | 1/1996 | Kulka et al. ................ | 73/146.5 |
| 5,743,645 A | * | 4/1998 | Jaynes ......................... | 374/115 |
| 5,801,304 A | * | 9/1998 | Cantu et al. ................... | 73/146 |
| 5,874,670 A | * | 2/1999 | Doda et al. ................... | 73/146 |
| 5,909,171 A | * | 6/1999 | Kyrtsos ...................... | 116/208 |
| 6,023,967 A | * | 2/2000 | Chung et al. ................. | 73/146 |
| 6,082,424 A | * | 7/2000 | Miyazaki ............... | 152/209.14 |
| 6,100,923 A | * | 8/2000 | Sass et al. ................... | 348/207 |
| 6,212,947 B1 | * | 4/2001 | Shimizu et al. .............. | 73/146 |
| 6,359,690 B1 | * | 3/2002 | Discenzo et al. ...... | 250/227.24 |
| 6,540,858 B1 | * | 4/2003 | Caretta et al. ........... | 156/110.1 |
| 6,546,791 B1 | * | 4/2003 | Yurjevich .................... | 73/146 |
| 2003/0214394 A1 | * | 11/2003 | Behrendsen ................. | 73/146 |
| 2004/0015312 A1 | * | 1/2004 | Asano et al. .................. | 73/146 |

FOREIGN PATENT DOCUMENTS

| JP | 200007594 A | * | 3/2000 | ............ G09F/3/02 |
|---|---|---|---|---|
| JP | 2000283893 A | * | 10/2000 | .......... G01M/17/02 |
| JP | 2001208618 A | * | 8/2001 | ............ G01K/1/16 |

* cited by examiner

*Primary Examiner*—Diego Gutierrez
*Assistant Examiner*—Mirellys Jagan
(74) *Attorney, Agent, or Firm*—Sughrue Mion, PLLC

(57) ABSTRACT

The temperature of the tread surface part of a tire is increased by running the tire in contact with a drum. The increase in the temperature of the tread surface part is due to the heat of friction between the tread surface part and the drum. Because large increases in temperature indicate that the friction is causing a large amount of wear, it is possible to forecast with ease the amount of wear of the tire from the increase in temperature of the tread surface part. The temperature of the tread surface part can be measured using a thermography machine, and the wear in the tread can be determined by looking at an image that shows the temperature.

14 Claims, 10 Drawing Sheets

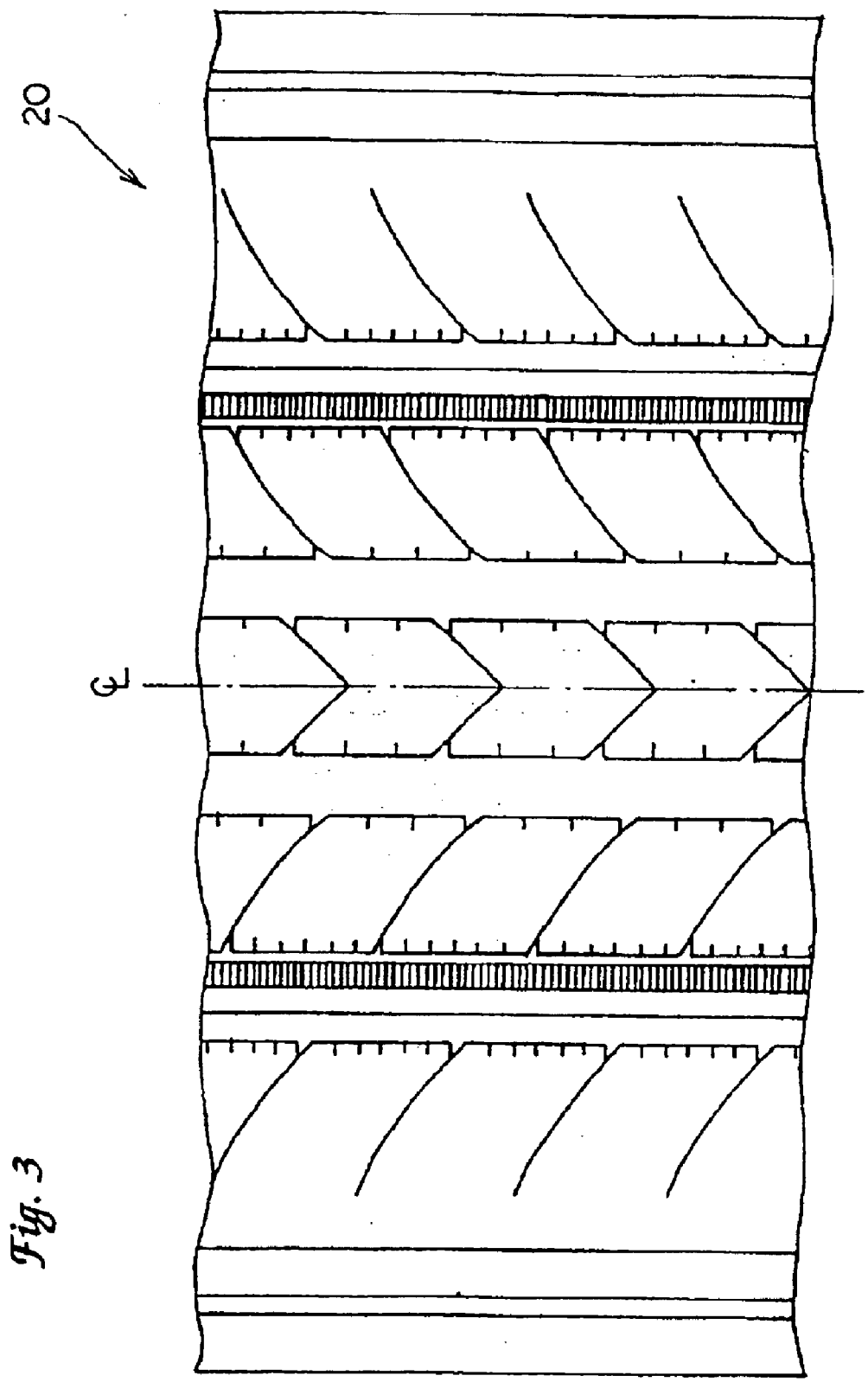

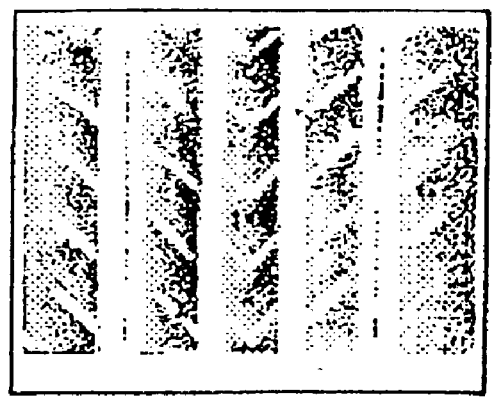
Fig. 7A
Fig. 7B
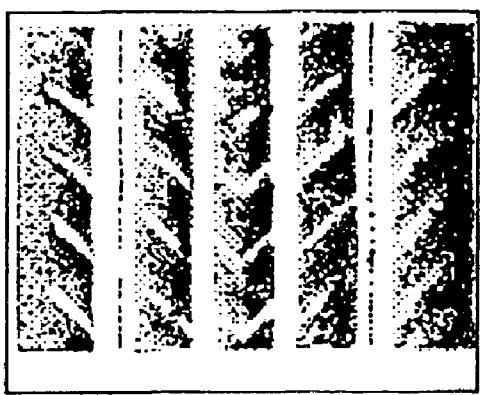
Fig. 7C
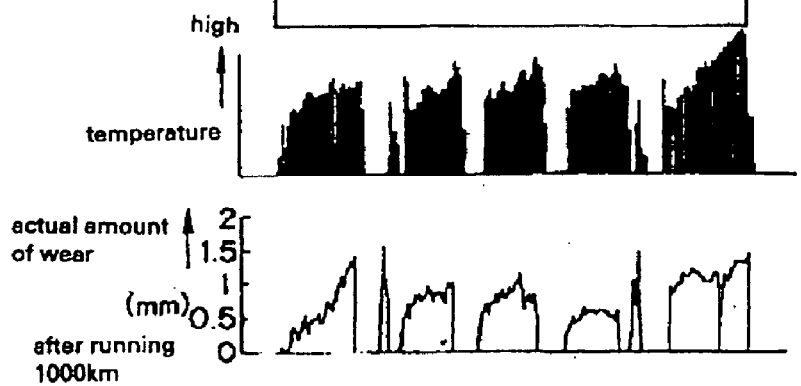
Fig. 7D
Fig. 7E Fig. 9A
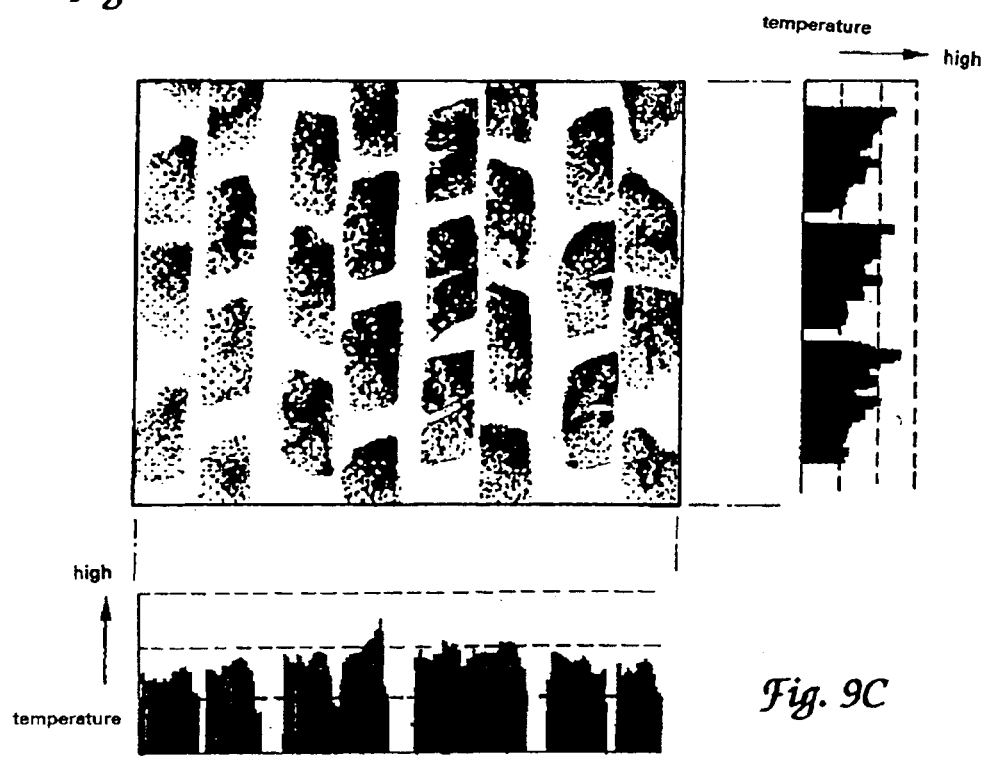
Fig. 9B
Fig. 9C

TIRE WEAR FORECASTING METHOD AND APPARATUS

BACKGROUND OF THE INVENTION

1. Field of the Invention

The present invention relates to methods and apparatus for forecasting tire wear.

2. Background Art

In order to investigate the relationship between tire travel distance and tire wear, conventionally, tire wear has been caused by attaching the tires to, and running the tires on, drum test equipment, or installing the tires on actual vehicles and running the tires thereon.

However, causing wear on the tires requires the travel distance to be extremely long, so there is a problem in that the testing period before test results are obtained is long. More rapid methods for forecasting tire wear have therefore been proposed.

In the past, when forecasting tire wear, a method has been used in which the shearing force operating on the tire tread and the movement (from the deformation) is measured.

However, an excessive amount of time must be spent in order to make the tread pattern wear image visible when measuring only a single point on the tread, so it is not possible, in practice, to estimate the wear on the tread of the tire as a whole.

This invention takes the above situation into account and has a purpose of providing a tire wear forecasting method and apparatus for easily forecasting tire wear.

SUMMARY OF THE INVENTION

In a tire wear forecasting method according to one embodiment of the invention, the wear on the tire is forecasted based on an increase in the temperature of a tread surface part or based on the temperature of the tread surface part after increasing its temperature, by causing the tire to come into contact with, and to run on, a road surface.

The increase in temperature of the tread surface part is due to the heat of friction between the tread surface part and the road surface.

The tread surface part temperature is high after travel since there is a high level of friction and a large amount of wear and, thus, it is possible to easily forecast the tire wear from the temperature increase in the tread surface part or from the temperature of the tread surface part. Additionally, by measuring the temperature of the entire tread surface, it is possible to estimate the wear or the tread of the tire as a whole.

The aforementioned temperature of the tread surface may, for example, be measured during an interval when, compared to the temperature of the groove in the tread, the temperature of the tread surface is higher.

When the tire is running, heat is produced by friction between the tread surface part and the road surface, and hysteresis loss accompanying the deformation of the rubber and the other tire constituent materials also produces heat within the tire.

The heating due to hysteresis loss will, when viewed from the outside of the tire, appear first in the tread grooves.

Because the wear on the tire is the result of friction with the road surface, or in other words, because only the heat from the friction between the road surface and the tire surface is relevant, the heat from the hysteresis loss is an error factor.

As a result, it is desirable to increase the measurement accuracy by measuring the temperature before the effect of the heating due to hysteresis loss reaches the tread surface (or while this heat has little effect even if it does reach the surface), or in other words, during the time over which the temperature of the tread surface part is high relative to the temperature of the groove part.

Additionally, when the temperature of the tread groove matches the temperature of the tread surface, it becomes difficult to discern the groove part from the tread surface part when, for example, thermal measurements are taken using thermography.

The temperature may, for example, be measured within 90 seconds after the tire starts running.

The tire temperature, before the tire starts running, is preferably lower than the road surface temperature.

When the temperature of the tire is higher than the temperature of the road surface at the time the running is started, the heating due to friction is canceled out, and, in extreme cases, the temperature of the tread surface falls after running is initiated, making it problematic to accurately obtain the increase in temperature. Because of this, it is desirable that the tire temperature be lower than the temperature of the road surface when the running is started.

Furthermore, when the temperature of the tread groove is the same as the temperature of the tread surface, it is difficult to see the boundary between the groove part and the tread surface part from thermal display imaging, making it difficult to forecast the wear of the tread surface.

The tire may be cooled before running it so that the temperature of the tire is lower than the temperature of the road surface.

Alternatively, or in addition thereto, the road surface may, for example, be heated so that it is higher than the temperature of the tire.

The measured temperature may be corrected based on the length of the tire contact surface.

When the temperature of the tire tread surface before running is different from the temperature of the road surface, for example, when the temperature of the road surface is higher than the temperature of the tire tread surface, the tire tread surface heats up by receiving heat from the road surface due to the contact between the tire tread surface and the road surface. Additionally, the heating due to the contact with the road surface will vary depending on the length of the contact surface with the road surface in the peripheral direction of the tire. Specifically, an increase in temperature when the length of the contact surface is longer (so that the duration of the contact between the road surface and the tread surface is longer) will be greater than when the length of the contact surface is shorter (so that the duration of the contact between the tread surface and the road surface is shorter).

Because of this, it is preferable to improve the forecast accuracy by correcting the increased temperature based on the length of the tire contact surface when the temperature of the tire tread surface is different from the temperature of the road surface and when tires with different contact surface lengths (when viewed in the tire peripheral direction) are used (which generally includes most tires). In particular, this is effective in increasing the forecasting accuracy when the temperature differential between the tire tread surface and the road surface is large.

The tire wear may be forecasted based on the temperature differential calculated by subtracting the temperature of the tread surface part before rotation begins from its temperature during rotation.

When the temperature of the tire tread surface part is measured before the commencement of rotation, it is desirable to do so before the tire contacts the road surface. The reason for this is that the temperature of the tread surface part that contacts the road surface will change due to the contact between the tire tread surface and the road surface (causing the temperature of one portion of the tread in the peripheral direction to change) if there is a temperature differential between the tire tread surface and the road surface, and the amount by which the temperature changes in the tread surface part that contacts the road surface will be greater when the time of contact between the tire tread surface and the road surface is longer.

Additionally, when there is a temperature differential between the tire and the surrounding air, it is preferable that the time between the temperature measurement and the commencement of rotation be as short as possible (particularly if the temperature differential is great). The reason for this is that letting the tire sit when there is a temperature differential between the tire and the surrounding air will cause a change in the temperature of the surface of tire, or in other words, in the temperature of the tread surface, and the amount of temperature change in the tire will be larger the longer the tire is allowed to sit.

The temperature measurement may be performed using a non-contact radiant thermometer, making it possible to perform the temperature measurements with ease even when the tire is rotating. One such non-contact radiant thermometer is a thermography machine.

The temperature measurement may be performed using thermography, making it possible to discern visually the temperature of the tire tread surface, or in other words, making it possible to see visually the status of wear of the tread surface.

The invention is also directed to a tire wear forecasting apparatus that forecasts tire wear based on the temperature of the tread part after causing the tire to come into contact with, and to be run on, a road surface in order to increase the temperature of the tread part. The tire wear forecasting apparatus includes a tire support that supports the tire so that it can rotate, a road surface that contacts the tire, means for driving the tire and/or the road surface in order to cause the tire to rotate, and means that measures, without contact, the temperature of the tread surface part and discerns the temperature distribution of the tread surface part from the temperature measurement results.

A memory device may be provided for recording multiple temperature measurement results, and a calculating device may be provided for calculating the temperature differences of the temperature measurement results from the first temperature measurement and the temperature measurement results from the second temperature measurement at the temperature measurement locations.

The calculating device calculates the temperature differential (the increase in temperature) of the locations where the temperature is measured, by subtracting the results of the temperature measurement during the first temperature measurement from the results obtained for the temperature measurement during the second temperature measurement. The first temperature measurement is, for example, the temperature measurement taken before the running of the tire started. The second temperature measurement is the temperature measurement after a specific amount of time has passed after the start of running.

When the temperature of the tire tread surface part is measured before the commencement of rotation, it is desirable to do so before the tire contacts the road surface.

An inputter can be provided for inputting the length of the tire contact surface, as well as a compensator for correcting at least the temperature measurement results based on the length of the contact surface. For example, when the temperature of the tire is lower than the temperature of the road surface, the compensation coefficient is larger when the contact surface length is short, and smaller when the contact surface length is long.

The compensator can also perform compensation for temperature increases by multiplying the compensation coefficient based on the contact surface length.

A display part may be provided whereon at least the temperature measurement results are visible. The display part can also make the temperature increases visible.

A cooling means may be provided for cooling the tire, and/or a heating means may be provided for heating the road surface.

BRIEF DESCRIPTION OF THE DRAWINGS

FIG. 3 shows a tread pattern.

FIG. 7A is an image taken before compensating for the contact surface length; FIG. 7B is a graph showing the corresponding temperature distribution; FIG. 7C is an image after compensating for the contact surface length; FIG. 7D is a graph of the corresponding temperature distribution; and FIG. 7E is a graph showing the actual amount of wear.

FIG. 9A is an image of a tire tread shown in FIG. 10; FIG. 9B is a graph showing the corresponding temperature distribution in the peripheral direction of the tire; and FIG. 9C is a graph showing the corresponding temperature distribution in the axial direction of the tire.

DETAILED DESCRIPTION OF THE PREFERRED EMBODIMENTS

Figure 1:
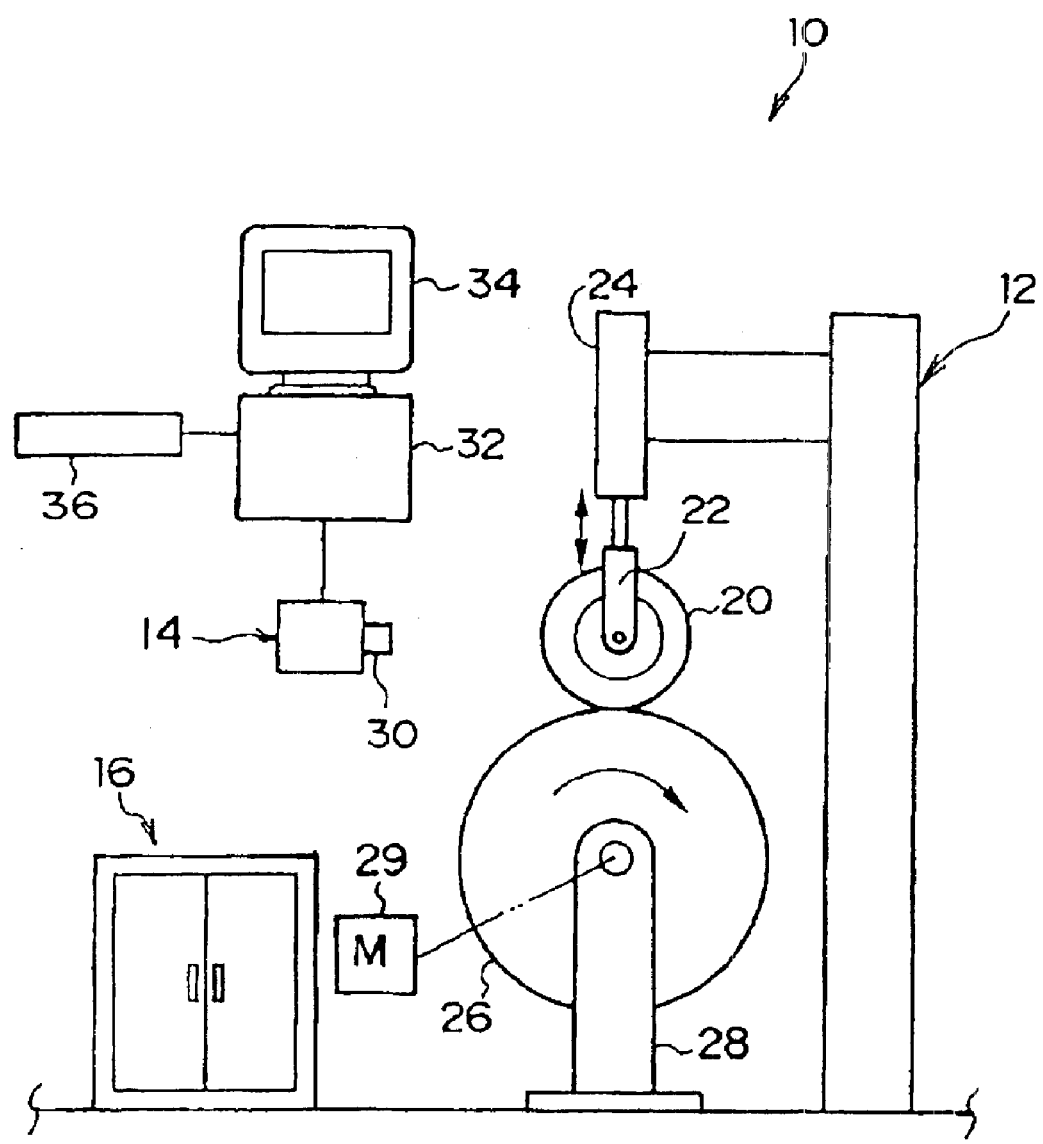
FIG. 1 is a schematic structural drawing of the tire wear forecasting apparatus of the first example of the embodiment of this invention.

Preferred embodiments of the tire wear forecasting apparatus of this invention will be described below in connection with the drawing figures.

As shown in FIG. 1, the tire wear forecasting apparatus 10 of this example of the embodiment comprises a drum test apparatus 12, a thermography machine 14, a refrigerator 16, a computer 32, an image display device 34, and a scanner 36.

The drum test apparatus 12 is equipped with a tire support means 22, that holds the tire 20 so that it can rotate freely, and this tire support means 22 can be moved up and down by a cylinder 24. A drum 26 is positioned below the tire support means 22.

The drum 26 is held by an axle of a support member 28 such that it can rotate freely, and is rotated by a motor 29.

The thermography machine 14 is provided with an infrared camera 30 that is able to detect infrared light that is radiated from the object for which the temperature is to be measured (tire 20 in this embodiment).

For the thermography machine 14, the Japan Avionics, Ltd., TVS-8000, is one example of a machine that can be used, although other instruments are also acceptable.

The infrared camera 30 photographs the tire 20 and sends the temperature information (the results of the temperature measurement) to the computer 32.

The computer 32 comprises, for example, a CPU (calculating device), a ROM, and RAM (memory devices), etc. It performs calculations on the temperature information from the tire 20 that was photographed by the infrared camera 30 of the thermography machine 14, and displays on the image display device 34 an image of the tire with the temperatures indicated by the density (or differentiating the high and low temperatures by color).

The computer 32 is able to store multiple temperature data in memory, and is able to calculate temperature changes between a first photograph and a second photograph by subtracting the temperature data obtained by the first photograph from the temperature data obtained by the second photograph. The image display apparatus 34 indicates the temperature when the picture was taken (or the change in temperature) by the density (or by separating the temperatures by color) in the tire image display.

Additionally, the computer 32 is connected to a scanner 36. The scanner 36 can read in footprint of the tire 20.

The computer 32 is able to calculate the length of the contact surface in the tire peripheral direction at various positions in the tire axial direction, doing so based on the footprint read by the scanner 36, and can convert this data and store it as a compensation coefficient.

Furthermore, the computer 32 performs compensation for the temperature information by multiplying the temperature information that has been stored by the compensation coefficient so that it is able to display a tire image based on the corrected temperature information in the image display device 34. Note that the computer 32 compensates for the amount of temperature change by multiplying the compensation coefficient with the temperature change obtained from the calculation, and is able to display a tire image on the image display device 34 based on the corrected temperature change.

Furthermore, the computer 32 is able to perform various calculations based on the temperature data that has been stored, so that, for example, it is possible to display a temperature distribution along the tire peripheral direction at any given position in the tire axial direction. This may be displayed as a graph on the image display device 34. Further, it is possible to display a graph of the temperature distribution in the tire axial direction at any given location in the tire peripheral direction, the data being displayed on the image display device 34.

EXAMPLES

The following is an explanation of an example of the method used for forecasting the tire wear using the tire wear forecasting equipment 10 of this embodiment.

Figure 2A:
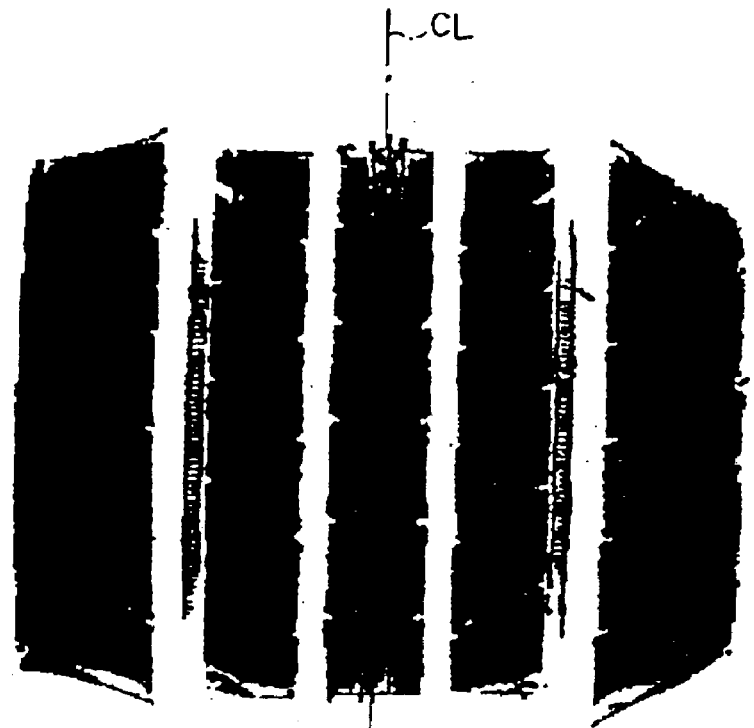
FIGS. 2A, 2B and 2C are respectively, a tire footprint, a graph showing the contact surface length, and a graph showing the compensation coefficients.

(1) First, a load is applied to the tire 20 and its footprint is taken. Note that at this time the load is the same operating load as will be applied to tire 20 by the drum test equipment 12. A footprint such as shown in FIG. 2A is obtained from a tire having the tread pattern such as shown in FIG. 3.

(2) The footprint is read in by the scanner 36. The computer 32 calculates the length of the contact surface in the tangential direction of the tire at the various positions in the axial direction of the tire based on the footprint that was read in, converts the contact surface lengths to compensation coefficients, and stores them in memory.

Figure 2B:
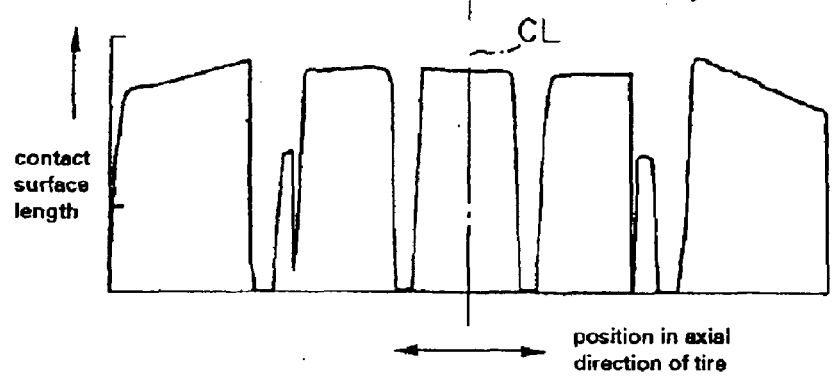

When the contact surface length at the various positions in the axial direction of the tire are displayed graphically, they appear as shown in FIG. 2B. The compensation coefficients at the various positions in the axial direction of the tire are graphed, and they appear, for example, as shown in FIG. 2C.

Figure 2C:
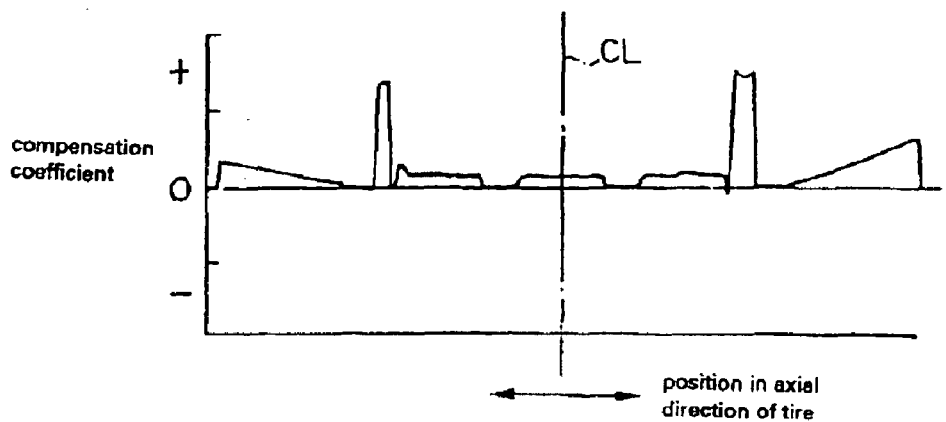

In the graph in FIG. 2C, the vertical axis indicates the magnitude of the compensation coefficient, while the horizontal axis shows the position in the axial direction of the tire. When they are correlated to the contact surface lengths at the various positions in the axial direction of the tire as shown in FIG. 2B, the compensation coefficients of the places where the contact surface lengths were short are relatively large when compared with the compensation coefficients of the places where the contact length is long.

(3) Next, the tire 20 is placed in the refrigerator 16 and is cooled uniformly. Note that the temperature of the tire 20 should be, preferably, about 8° C. cooler than the outer surface temperature of the drum 26.

(4) The tire 20, which is removed from the refrigerator 16 after it has been cooled, is immediately attached to a tire support 22. At this point, the tire 20 that is thus attached is not put in contact with the drum 26.

(5) The tread of the tire 20 is photographed (the first time) using the infrared camera 30, and the temperature information for the various places on the tread of the tire 20 is stored in the computer 32.

Either only a single portion of the periphery of the tread may be photographed, or the entire periphery of the tread may be photographed.

When the tire 20, after being removed from the refrigerator 16, is transported to the tire support part 22, for example, by rolling it along the floor, the tread surface part (a part that is in contact with the floor) is heated by the floor, causing its temperature to rise, leading to a temperature differential between the tread surface part and the groove part.

Figure 4A:
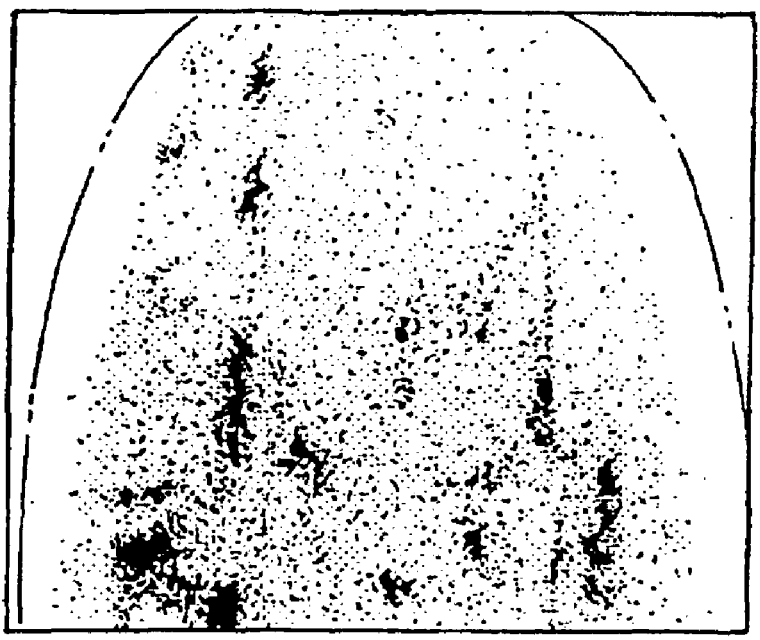
FIG. 4A is an image from a tire that has not been cooled.
Figure 8:
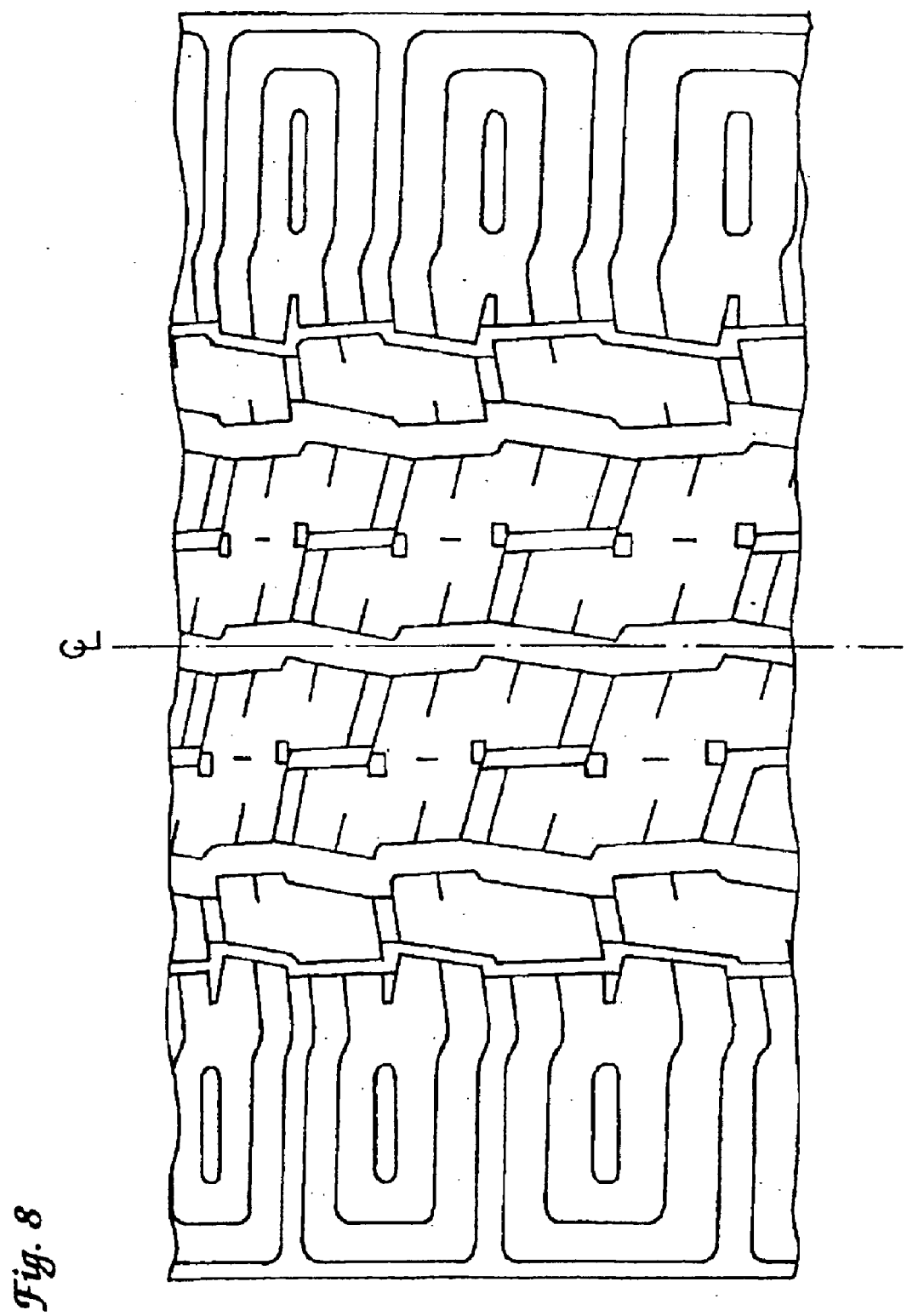
FIG. 8 shows a tread pattern.

FIG. 4A shows an image of, for example, the tread pattern shown in FIG. 8 as photographed by the infrared camera 30. The image in FIG. 4A is for a tire that has not been cooled.

Figure 4B:
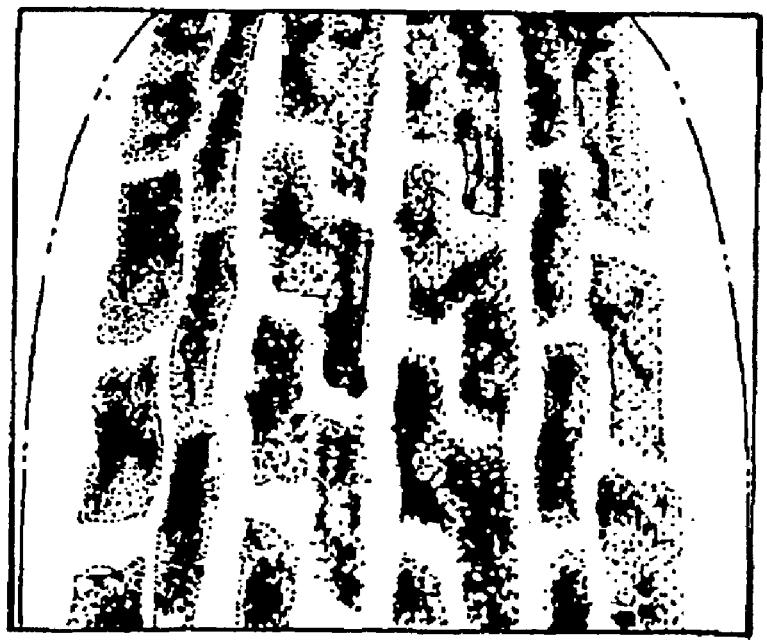
FIG. 4B is an image from a tire that has been cooled.

FIG. 4B shows a display of the image display device 34, which is an image showing the temperature of the tread wherein there is a temperature differential between the tread surface part and the groove part. It is possible to differentiate between the tread surface part and the groove part. The temperature differences are displayed by color density, and in the image showing the temperature in FIG. 4B, high temperatures are indicated with higher densities. The tire shown in FIG. 4B has been cooled.

When the tire is not cooled, it is more difficult to differentiate between the tread surface part and the groove part, as shown in FIG. 4A. This is because there is little difference between the temperature in the groove and the temperature of the tread surface part.

(6) The drum 26 is caused to rotate, after which the pneumatic cylinder 24 is activated causing the tire 20 to apply a specific load (for example, the maximum load as described in the JATMA, TRA and ETRTO Standards) on the outer peripheral surface of the drum 26.

By doing so, the tire 20 rotates in contact with the drum 26, and the temperature at the contact surface rises due to friction with the drum 26.

(7) At 15 seconds after the commencement of the rotation of tire 20, a trigger causes the camera 30 to photograph (second time) the same position on the tread as was photographed in Step (5), and the temperature information for the various positions on the tread is stored in the computer 32.

Although the second photograph (temperature measurement) was taken 15 seconds after the commencement of rotation of tire 20, the second photograph should be taken at any time wherein the influence of the heating due to hysteresis loss is not yet apparent and wherein, in practice, the temperature of the groove part (the bottom of the groove) has not propagated to affect the temperature of the tread surface.

Figure 6:
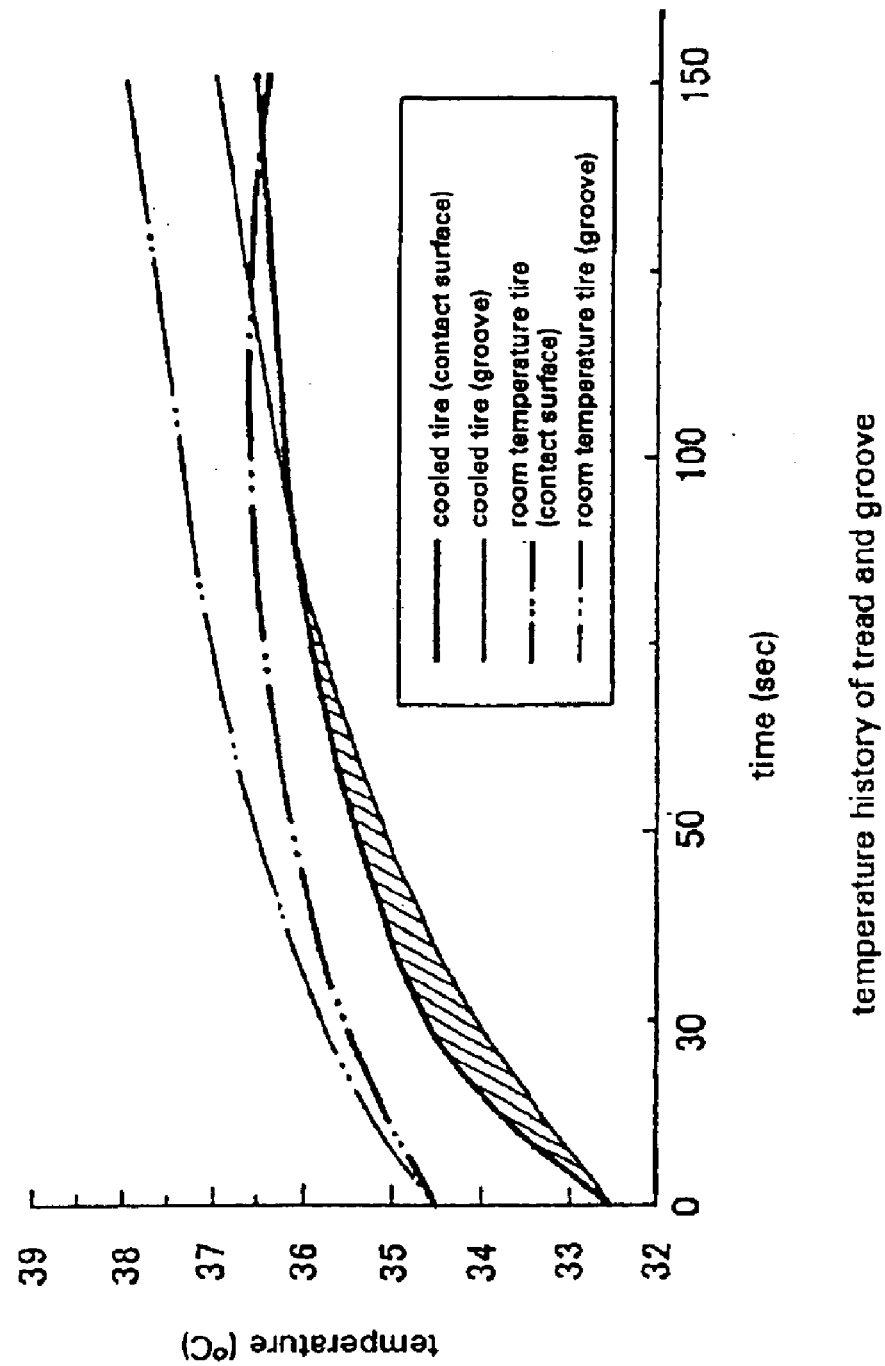
FIG. 6 is a graph showing the relationship between tire running time and temperature.

FIG. 6 shows the graphs of the results of an investigation into the relationship between the tread surface (contact surface) temperature, the groove part temperature, and the elapsed travel time, using a tire that had been cooled in advance and a tire at room temperature. The room temperature tire, as shown by the double dotted lines, had higher temperatures in the groove part than in the contact surface after the tire began rotation while, in contrast, in the tire that had been cooled in advance, as shown by the solid lines, the temperature in the groove part was lower than the temperature in the tread surface part until a certain amount of time had elapsed, and after about 90 seconds, the temperature of the groove part surpassed the temperature of the tread surface part.

Figure 5A:
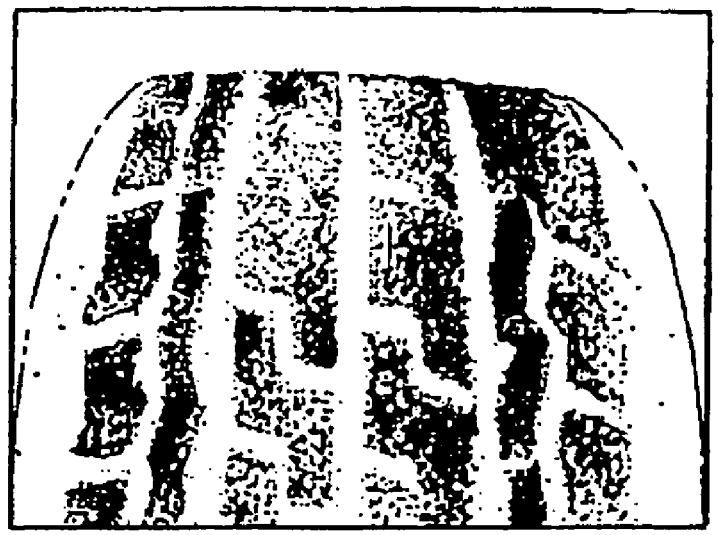
FIG. 5A is an image of a tire 30 seconds after the start of running.

For example, when a tire with a tread pattern such as shown in FIG. 8 is rotated and the temperature of the tread surface part is increased by friction with the drum 26, in the image that is shown on the image display device 34, as shown in FIG. 5A, it is possible to discriminate between the tread surface part and the groove part. Although FIG. 5A shows an image taken 30 seconds after the commencement of travel, the image is comparable to the image taken after 15 seconds.

Figure 5B:
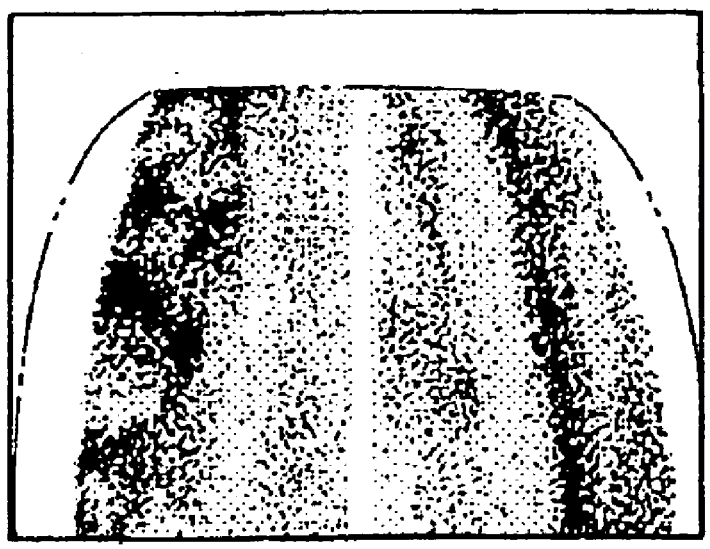
FIG. 5B is an image of the tire 120 seconds after the start of running.

However, at the point 120 seconds after the commencement of rotation, the temperature of the groove part has also increased through heating from within the tire (due to the hysteresis loss), causing the temperature to rise to about the same temperature as the tread surface part, with the result that it becomes impractical to differentiate between the groove part and the tread surface part, as shown in FIG. 5B.

Because of this, it is preferable for the second photograph to be taken during the time in which the temperature of the groove part has not yet reached the temperature of the tread surface part. This is because, when the temperature of the groove part is close to the temperature of the tread surface part, it becomes extremely difficult to differentiate the tread surface part using the image that is displayed on the image display device 34.

Heat from sources other than friction, such as the heat from hysteresis loss, causes temperature differentials, and it is necessary to either minimize this heat or to minimize the effect on the tread surface.

Consequently, it is desirable to take the second photograph before too much heat from the hysteresis loss is apparent, or in other words, within 15 to 30 seconds after commencement of rotation.

(8) The computer 32 subtracts the temperature obtained in Step (5) from the temperature obtained in Step (7) to calculate the amount of heating due to friction alone (i.e., excluding the temperature distribution from before the measurement).

(9) The computer 32 compensates the temperature increase obtained in Step (8) using the compensation coefficient obtained in Step (2). It is possible to compensate for the effect of heat received from the drum 26 by applying the compensation coefficient.

(10) The temperature information for only that increase in temperature for which compensation is performed, or in other words, for the temperature increase due to friction alone, is used as the basis for displaying the tire image on the display device 34, doing so through the use of color densities.

FIG. 7B shows a graph of the temperature distribution in the axial direction of the tire (the average value along the periphery of the tread surface part), and FIG. 7A is an image showing the temperature before compensation of the tire tread that has the tread pattern shown in FIG. 3. FIG. 7C shows an image of the temperature after compensation; FIG. 7D is a graph showing the temperature distribution in the axial direction of the tire (the average value along the peripheral direction of the tread surface part); and FIG. 7E is a graph of the actual wear after 1000 km of travel.

When the graph of the temperature distribution in the axial direction of the tire (FIG. 7D) is compared with the graph of the actual wear (FIG. 7E), it can be seen that there is excellent correspondence between increased temperature and the amount of wear. Thus the temperature can be used to predict or forecast the amount of wear.

Figure 10:
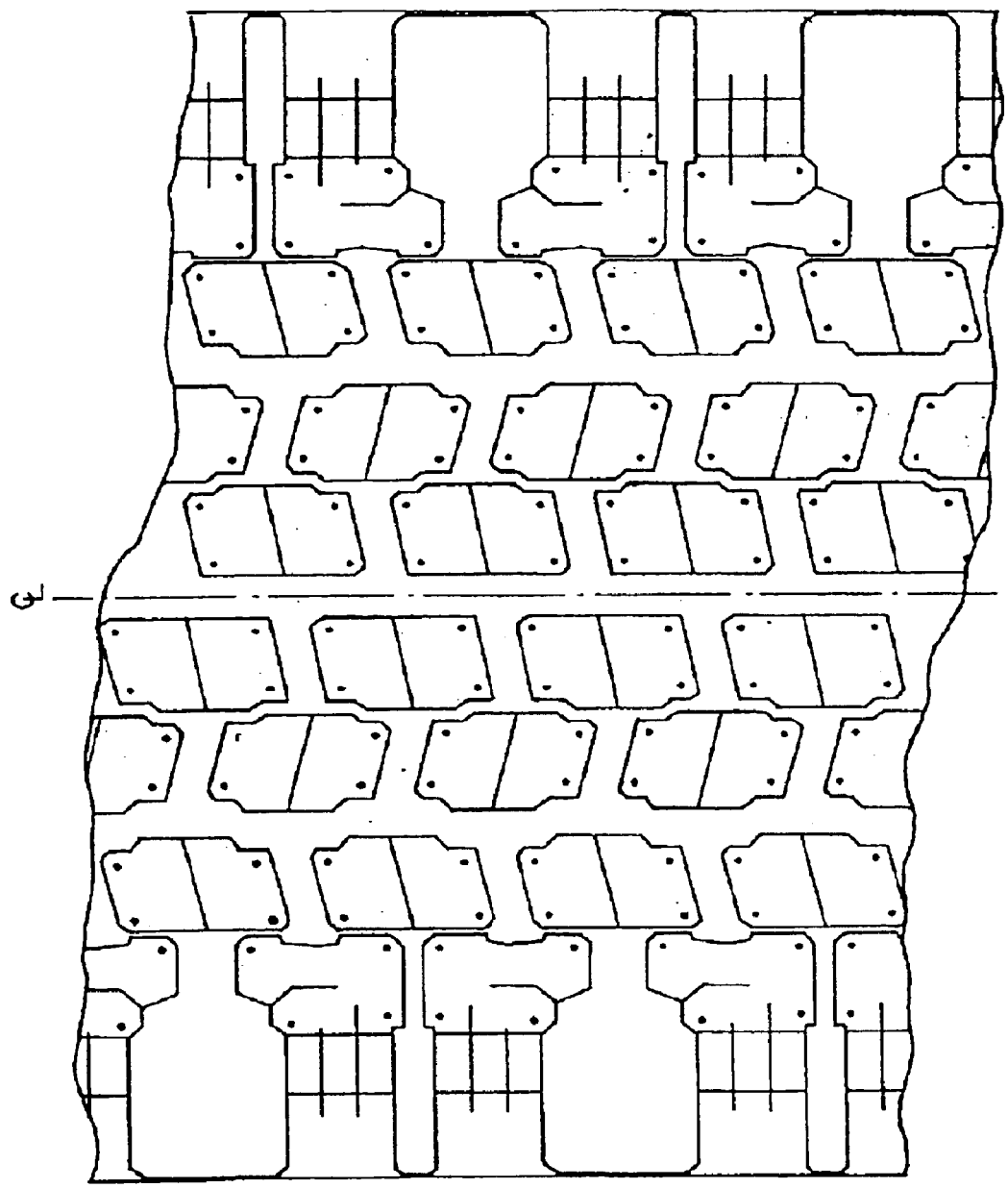
FIG. 10 shows a tread pattern.

Additionally, FIG. 9A shows an image of the temperature of a tire with the tread pattern shown in FIG. 10; FIG. 9C is a graph showing the temperature distribution in the crosswise direction across the same tread; and FIG. 9B is a graph showing the temperature distribution of the tread in the peripheral direction of the tire.

For example, from the image shown in FIG. 9A and the graph of FIG. 9B, it can be seen that there are differences in temperature along the peripheral direction of the tire in the tread blocks. From this, it is possible to forecast the uneven wear (heel and toe wear) that will occur in the tire blocks.

The non-uniformity of the temperature in the axial direction of the tire can be seen in the image in FIG. 9A and the graph of FIG. 9C. This can be used to forecast rib punch, edge wear, etc., that will occur in the tire block.

As described above, it is possible to forecast rapidly the wear in the tire 20 without requiring time-consuming drum tests or on-vehicle tests that have been performed in the past, doing so by using the tire wear forecasting apparatus 10 of this embodiment.

In the embodiment described above, a tire 20 was cooled before it was run, and although this had an influence on the tire 20 so that the tread surface part could be differentiated, an alternative is to heat only the tread surface of the tire 20 (without cooling the tire 20) to create a temperature differential with the groove part in order to be able to differentiate the tread surface part before taking the photograph of the tire 20.

In order to do this, a heater (heating means) is equipped within the drum 26, and the tire can be brought into contact with the drum 26 (which has been heated) and rotated for a short period of time. The first picture may be taken at that point.

Note that the tire 20 may be rotated after applying a camber angle, a slip angle, etc., to the tire. By doing so, it is possible to forecast wear under conditions that are similar to actual driving conditions.

Furthermore, it is possible to forecast the wear that will occur through sudden braking (tire lock) by bringing the tire 20, with its brakes applied, into contact with the rotating drum 26 and then photographing the part that is in contact with the drum 26.

Note that in the embodiment above, the tire 20 was brought into contact with the rotating drum 26 to cause it to rotate; however, tire 20 can be brought into contact with a belt, asphalt, concrete, or other actual road surfaces and caused to rotate in that condition.

In addition, in the embodiment above, the drum 26 was rotated by the motor 29; however, a motor may be equipped in the tire support 22 to apply a driving force to the tire 20 to cause it to rotate.

The tire wear forecasting method and tire wear forecasting apparatus of this invention, as described above, have the superior effect of being able to forecast tire wear easily and rapidly.

The above description is of a preferred embodiment of the invention, and it will be obvious to those skilled in the art that various changes and modifications may be made without departing from the invention, and it is intended, therefore, to cover in the appended claims all such changes and modifications as fall within the true spirit and scope of the invention.

What is claimed is:

1. A tire tread wear forecasting method comprising:
   measuring a temperature of a tread surface part of a tire,
   increasing the temperature of the tread surface part by causing the tire to come in contact with, and to rotate on, a road surface,
   measuring an increase in temperature of the tread surface part of the tire or the temperature of the tread surface part, and
   forecasting tire wear of said tire based on a temperature differential calculated by subtracting the temperature of the tread surface part before the tire is rotated from the temperature of the tread surface part after rotation begins or based on the measured increase in temperature.

2. The tire wear forecasting method of claim 1, comprising measuring the temperature of the tread surface part after rotation begins during an interval when, compared to the temperature of a groove in the tread, the temperature of the tread surface part is higher.

3. The tire wear forecasting method of claim 1, comprising measuring the temperature within 90 seconds after the tire begins to rotate.

4. The tire wear forecasting method of claim 1, comprising correcting said temperature of the tread surface part after rotation begins based on a length of a tire contact surface.

5. The tire wear forecasting method of claim 1, comprising measuring at least one of the temperature of the tread surface part before rotating and after rotating using a non-contact radiant thermometer.

6. The tire wear forecasting method of claim 5, wherein the non-contact radiant thermometer is a thermography machine.

7. The tire wear forecasting method of claim 1, wherein the temperature of the tread surface part, before the tire starts rotating, is lower than the temperature of the road surface.

8. The tire wear forecasting method of claim 7, comprising cooling the tire before rotating it so that the temperature of the tread surface part is lower than the temperature of the road surface.

9. The tire wear forecasting method of claim 7, comprising heating the road surface so that the temperature of the road surface is higher than the temperature of the tread surface part.

10. A tire tread wear forecasting apparatus that forecasts the tread wear based on a temperature of a tread surface part of a tire after causing the tire to come in contact with, and to rotate on, a road surface, in order to increase the temperature of the tread surface part, said tire tread wear forecasting apparatus comprising:
   a tire support that supports the tire so that the tire can rotate;
   a road surface that contacts the tire;
   means for driving at least one of the tire and the road surface in order to cause the tire to rotate;
   means for measuring, without contact, the temperature of the tread surface part and for discerning a temperature distribution of the tread surface part from the measured temperature,
   means for forecasting tread wear based on information from said measuring means, and
   a memory device for recording multiple temperature measurements, and
   a calculating device for calculating temperature differences of the temperature measurements from a first of said temperature measurements and the temperature measurements from a second of said temperature measurements of said tread surface part.

11. A tire tread wear forecasting apparatus that forecasts the tread wear based on a temperature of a tread surface part of a tire after causing the tire to come in contact with, and to rotate on, a road surface, in order to increase the temperature of the tread surface part wherein the temperature of the tire tread surface before rotating is different from the temperature of the road surface, said tire tread wear forecasting apparatus comprising:
   a tire support that supports the tire so that the tire can rotate;
   a road surface that contacts the tire;
   means for driving at least one of the tire and the road surface in order to cause the tire to rotate;
   means for measuring, without contact, the temperature of the tread surface part and for discerning a temperature distribution of the tread surface part from the measured temperature,
   means for forecasting tread wear based on information from said measuring means,
   an inputter that inputs a length of a tire contact surface into a compensator, wherein said compensator corrects at least the measured temperature based on the length of the tire contact surface that has been input by the inputter.

12. A tire tread wear forecasting apparatus that forecasts the tread wear based on a temperature of a tread surface part of a tire after causing the tire to come in contact with, and to rotate on, a road surface, in order to increase the temperature of the tread surface part, said tire tread wear forecasting apparatus comprising:
   a tire support that supports the tire so that the tire can rotate;
   a road surface that contacts the tire;
   means for driving at least one of the tire and the road surface in order to cause the tire to rotate;
   means for measuring, without contact, the temperature of the tread surface part and for discerning a temperature distribution of the tread surface part from the measured temperature, and means for forecasting tread wear based on information from said measuring means, and means for cooling the tire.

13. A tire tread wear forecasting apparatus that forecasts the tread wear based on a temperature of a tread surface part of a tire after causing the tire to come in contact with, and to rotate on, a road surface, in order to increase the temperature of the tread surface part, said tire tread wear forecasting apparatus comprising:

a tire support that supports the tire so that the tire can rotate;

a road surface that contacts the tire;

means for driving at least one of the tire and the road surface in order to cause the tire to rotate;

means for measuring, without contact, the temperature of the tread surface part and for discerning a temperature distribution of the tread surface part from the measured temperature, and means for forecasting tread wear based on information from said measuring means, and means for heating the road surface.

14. A tire wear forecasting method comprising:

contacting and running a tire on a surface;

measuring a temperature of the tire or an increase in the temperature of the tire a predetermined period of time after said running step is started; and forecasting wear on the tire based on a result of said measuring step, wherein said forecasting step comprises forecasting a relative amount of wear and a location of the wear on a tread surface of the tire.

* * * * *